Patented Oct. 17, 1922.

1,432,634

UNITED STATES PATENT OFFICE.

CLARENCE S. STEVENS, OF SHEBOYGAN, AND CARL A. BAUMANN, OF JEFFERSON, WISCONSIN, ASSIGNORS, BY MESNE ASSIGNMENTS, TO CARNATION MILK PRODUCTS COMPANY, OF CHICAGO, ILLINOIS, A CORPORATION OF DELAWARE.

MILK FOOD PRODUCT.

No Drawing. Application filed June 30, 1917. Serial No. 177,979.

*To all whom it may concern:*

Be it known that we, CLARENCE S. STEVENS and CARL A. BAUMANN, citizens of the United States, and residents, respectively, of Sheboygan, in the county of Sheboygan, and of Jefferson, in the county of Jefferson, and State of Wisconsin, have invented certain new and useful Improvements in Milk Food Products, of which the following is a true and complete specification.

This invention relates to milk food products, and has for its object to provide an improved process and improved product consisting of animal milk, from which butter fat has been extracted, and a vegetable oil, or vegetable oils free from free fatty acids, have been substituted, whereby the high value of butter fat may be utilized separate from the milk, and the lower priced vegetable oils may be made palatable and available as foods.

In carrying out our improved process, the butter fat is extracted from the milk, either entirely or partially, and the skimmed milk resulting is conducted to heating vats and heated to only about 100° F. After it has been heated to this temperature by the aid of hot gas or steam, a vegetable fat or fats is added thereto, free from free fatty acids. This vegetable fat may be heated, under exclusion of air, before being added, to about 90° F.

The addition of the oil, or oils, to the heated skimmed milk, brings about a mixture of the same, in that the skimmed milk has been brought to a state of receptivity for the reception of these oils, and the oils on the other hand have also been brought, by the preliminary heating, to a state where they will more readily mix with the skimmed milk.

This mixture is then agitated, by suitable mechanical means, such as paddles, or the like, and is simultaneously subjected to a moderate heating. During this agitation, and heating, a more thorough mixing takes place between the skimmed milk and the added fat or oils.

This mixture is then conveyed directly to homogenizers of any approved type, and sent through the homogenizers at suitable pressures and at 105° F., which is substantially the temperature of the preliminary, and which is a comparatively low temperature.

It is desirable to maintain the temperature of the preheating vat during the homogenization process, and it is also important to maintain substantially this temperature while homogenization takes place and immediately thereafter. The homogenized mixture is then conducted to a suitable storage vat. The homogenized emulsion in this vat is kept under continual mechanical agitation until ready to be drawn off to the vacuum pan.

In the collecting vat, the different charges coming from the homogenizers are gathered and through the agitation are assembled so as to make a uniform emulsion therein at all times.

At this temperature, a portion of this homogenized mixture is conducted into the vacuum pan, and this homogenized mixture subjected therein to evaporation or condensation. When this is completed, other portions are successively evaporated. It will be noted that the temperature of the mixture while in the preliminary heater, and while it is being conveyed into the homogenizers from the preliminary heater, and while it is being conveyed from the homogenizers into the collecting vat and then to the vacuum pan, is maintained substantially the same, namely, about 105° F. This is desirable, as it is desired to keep the temperatures down, so as to prevent any re-formation of any free fatty acids, so as to maintain the vegetable fat in as neutral state as possible, preferably in substantially the same state as in its initial condition.

After it enters the vacuum pan, it is subjected to agitation, under vacuum and heat, and condensation in the vacuum pan process, and then is condensed to the desired degree of a cream-like consistency.

The volatile gases in the form of vapor which may be formed in the vacuum pan, further tend to carry off any free acids that may still remain and these are sucked out in the vacuum pans.

The homogenized, condensed, emulsified mixture is again introduced into a large vat which is maintained at substantially the vacuum pan temperature, and also in which suitable agitators are arranged, such as paddles, or the like, so as to continually agitate the homogenized condensed emulsion under such temperature until ready to be drawn off. This vat receives the various charges of the vacuum pan or pans, and brings about an emulsion uniform throughout.

The collecting vats described, which receive the charges of the first homogenizers, the charges of the vacuum pan or pans, and the charges of the second homogenizers are so dimensioned that a substantial equalization of their contents takes place. Though every precaution may be taken to endeavor to bring about a homogenization of the skimmed milk and fat being conducted from the preliminary heating vats to first homogenizers there may be a slight difference in the homogenization of the various quantities passing through the first homogenizers. Similarly, though every endeavor may be made to carry out the evaporation of each batch or charge to exactly the same degree, there may be a slight difference in the various quantities evaporated, and, similarly, with the quantities of homogenized and condensed emulsions, homogenized a second time. These vats are, as stated, so proportioned that these characteristics are equalized, and that whatever action or step of the process follows immediately after the collecting vats, acts on an uniformed or equalized product. If successive batches are run through the preheating vats on a single day, then it is desirable to leave a certain quantity of the previous run in the collecting vats, that is to say, a quantity sufficient to dominate the character of the contents of each of the vats. By the intermingling of this dominant quantity in each collecting vat left over from a previous run with the new batch being run, the end product is substantially uniform throughout the day's run. Thus the milk retained of one run commingling with the new run equalizes the characteristics of the various runs. Of course, towards the end of the day's run, the remaining quantities are processed, so as to have the apparatus discharged throughout and ready for the next day's run.

From this vat, the mixture is drawn, to homogenizers, where the mixture is again homogenized, and at a pressure of about two thousand to three thousand pounds, and of a temperature of about 140° F.

It is then drawn to cooling apparatus, cooled by a brine solution. Any suitable cooling apparatus, etc. may be employed to maintain the cooling temperature.

This immediate and rapid cooling, it is believed, brings about the setting of the oil particles, as well as increasing the viscosity of the other solids, such as casein, albumin, milk sugar, etc. This setting brings about a condition where there is an intimate joining of the edible vegetable fats and milk solids, in a manner so that they remain in permanent suspension and incapable of separation and form a stable emulsion. This cooled mixture is then conducted to filling or canning apparatus.

Thereafter, the cans are sterilized, at suitable sterilization temperatures, depending upon conditions known in the art, and thereafter the cans are subjected to a violent agitation by shaking.

The product, after emerging from the sterilizers, may be in the form of a jelly-like mass, which is then subjected to violent agitation by well known mechanical means. This agitation reconverts the aforesaid jelly-like mass into a liquid of cream-like consistency. The cans are then removed to suitable storage rooms, where they are maintained under certain regulated temperatures, and kept there for such suitable times as to develop any imperfections in the cans themselves which may cause the contents to swell and thereafter, the good being separated from the bad, the finished product is ready for the market.

It will be noted that, throughout the process described, the milk and the substituted fat or fats is maintained throughout in liquid state, with the exception of the jelly-like mass condition referred to. Other than this, it does not depart from such liquid state commencing at the skimmed milk liquid to the cream-like consistency of the end product.

The product made as described is a specific article only of cream-like consistency, not a batter, not a dry product, or not a powder.

The above described process enables a product to be produced which meets all the demands of the commercial requirements, and remains stable and in permanent suspension and incapability of separation, and free from the taste or odor of the added or substituted fat or fats.

The special feature of this process is to homogenize the mixture of fat and skimmed milk before it is condensed, and another feature is to carry out this homogenization substantially at the preheating vat temperature, namely, about 105° F., which is a comparatively low temperature, and then first to discharge the homogenized product into the vacuum pan, so that the homogenized mixture is immediately subjected to the action of the vacuum pan.

It has been found that fats, though refined and free from fatty acids, tend, when subjected to too much heat or light or air, to re-form free fatty acids. In order to prevent this, it is proposed to immediately homogenize and then evaporate the homogenized mixture, in the manner described.

Summarizing, the process consists of heating the skimmed milk, heating the fat, mixing them by mechanical agitation in preliminary heating vats, homogenizing the mixture, either immediately condensing or first emulsifying by jets of steam, live or superheated steam, and then condensing to cream-like consistency, in a vacuum pan, and then again homogenizing the emulsion at substantially the vacuum pan temperature, and finally rapidly cooling the homogenized emulsion, and finally canning under vacuum, and sterilizing and shaking the same.

By the process described, for obtaining the product, a process is proposed which is very efficient, because the fat is immediately homogenized with the skimmed milk, whereby a very thorough mixing of the fat with the skimmed milk is assured prior to the evaporation. The product itself is characterized by its pleasing flavor, the taste resembling closely that of evaporated whole milk, without the detection of the added fat. This we believe to be due to the fact that no free fatty acids are capable of being formed during the carrying out of the process, the presence of which free fatty acids would render the product rancid and of bad taste and unmarketable.

The edible vegetable oils that have been referred to must be neutral and may be corn oil, cottonseed oil, olive oil, cocoanut oil, sesame oil, oil from the soy bean, arachic oil, or blends thereof, all having highly nutritious qualities, and we have found particularly advantageous results in connection with the use of cocoanut oil. These oils may be combined as the taste or their constituents dictate, and then subjected to the process above described.

We have described our invention as above, but a second embodiment of our invention consists in carrying out all of the various steps under exclusion of light and air. This free from air and light free condition, retards the development of free fatty acids which might otherwise form by reason of the presence of the oil or oils, since such oils are susceptible to free fatty acid formation if exposed under certain conditions and certain times to air and light for which reason the process in the second embodiment of our invention consists in carrying out the various stages as described without the possibility of the actinic rays' light acting upon the oil. The air free condition may be brought about by connecting the closed vats or devices with a vacuum producing apparatus, which acts to produce a partial vacuum to maintain air exclusion, but insufficient to suck out any of the contents. The canning operation in this second embodiment closes the cans immediately and in an hermetical manner, so that the canning takes place free from air and in some places under vacuum.

Having fully described our invention, we claim as new, and desire to secure by Letters Patent:

We claim:

1. The process herein described, which consists in homogenizing an uncondensed mixture of milk substantially devoid of butter fat and an edible vegetable fat free from free fatty acids, then condensing the homogenized mixture, and immediately thereafter, rapidly cooling the condensate.

2. The process herein described, which consists in homogenizing an uncondensed mixture of milk from which butter fat has been extracted and an edible vegetable fat free from free fatty acids, and then after homogenization condensing the same.

3. The process herein described, which consists in heating milk from which butter fat has been extracted, adding thereto a fat free from free fatty acids heated to a temperature substantially that of the milk, homogenizing the mixture substantially at that temperature, condensing the homogenized mixture to a cream-like consistency, and then again homogenizing the said homogenized condensed emulsion.

4. The process herein described which consists in heating milk from which butter fat has been extracted, adding an edible vegetable fat of a temperature substantially that of the milk, homogenizing the said mixture, condensing the said homogenized mixture to an emulsion of cream-like consistency, again homogenizing the emulsion, and then rapidly cooling the same.

5. The herein described process which consists in homogenizing skim milk and an edible vegetable fat, condensing the homogenized milk and fat in separate batches, then mixing the condensed batches and separating the condensed mixture into batches and homogenizing the several condenser batches and finally uniting the homogenized condensed batches with each other and then adding the same to a quantity of the homogenized condensed product of a previous run to thereby obtain a characteristically uniform final product in the operation of the process.

In testimony, that we claim the foregoing as our invention, we have signed our names in presence of two subscribing witnesses.

CLARENCE S. STEVENS.
CARL A. BAUMANN

Witnesses:
AGNES Y. COUGAN,
MOE M. WEINBERG.